United States Patent [19]

Murray

[11] 4,309,400

[45] Jan. 5, 1982

[54] STARTUP PROCEDURE

[75] Inventor: Lawrence K. Murray, Bartlesville, Okla.

[73] Assignee: Phillips Petroleum Company, Bartlesville, Okla.

[21] Appl. No.: 161,180

[22] Filed: Jun. 19, 1980

[51] Int. Cl.$^3$ .......................... C01B 31/02; C09C 1/48
[52] U.S. Cl. .................................... 423/450; 423/449; 55/97
[58] Field of Search .............. 423/445, 449, 450, 455, 423/456, 461; 55/97; 422/150

[56] References Cited

U.S. PATENT DOCUMENTS 3,369,870  2/1968  Ganz et al. ........................... 423/450
3,464,184  9/1969  Wright ..................................... 55/97

*Primary Examiner*—O. R. Vertiz
*Assistant Examiner*—Gregory A. Heller

[57] ABSTRACT

Startup procedure for carbon black plant comprising producing hot combustion gases low in free oxygen, bringing the hot combustion gases into indirect heat exchange relationship with water to produce a high pressure, saturated stream of steam which is reduced in pressure to produce superheated steam, and cooled hot combustion gases, and using the superheated steam stream to warm bag filters to operating temperatures before starting operation of the plant to produce carbon black. In a preferred embodiment, the superheated steam is combined with the cooled combustion gases and the combined stream used to warm the bag filters.

8 Claims, 1 Drawing Figure

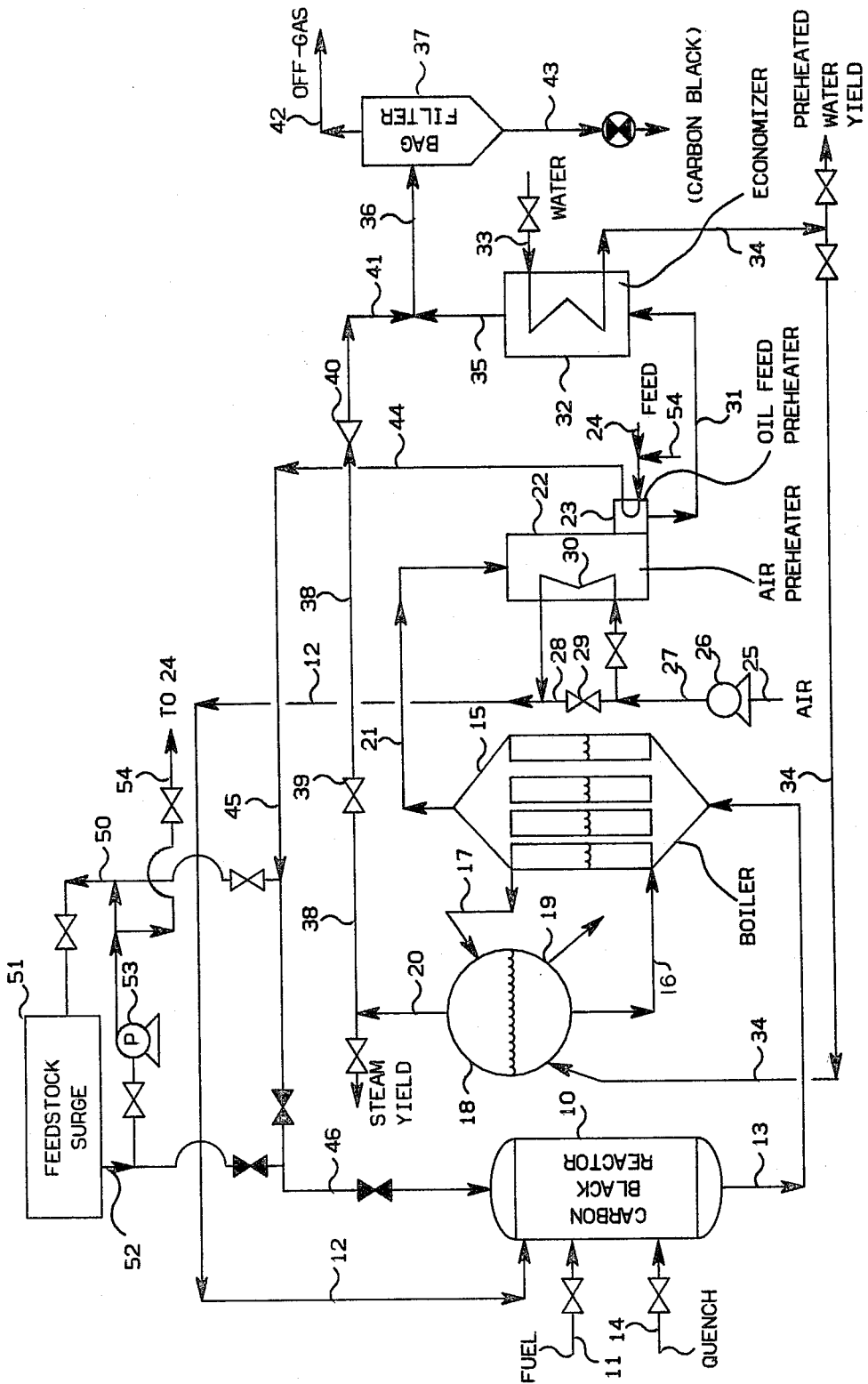

4,309,400

STARTUP PROCEDURE

This invention relates to carbon black production. In another aspect, this invention relates to a method for startup of a carbon black plant. In accordance with a further aspect, this invention relates to a startup procedure for a carbon black plant whereby the collection and separation equipment are brought to operating temperatures, with minimum water condensation and corrosion, by using a low oxygen content steam stream to warm the equipment especially the bag filters.

Carbon black producing systems for the preparation of furnace carbon blacks by partial combustion and/or thermal decomposition, to which the improvement of this invention is applicable, are well known. Basically, the components of a carbon black producing system are a highly specialized furnace called a reactor and a collection system which can include one or more units for recovering carbon black from the combustion gases and decomposition products produced in the reactor. The reactors can also have provision for introducing a spray of water or other coolant (quenching) into the smoke produced within the reactor to lower the smoke temperature before the smoke enters the collection system. One of the problems encountered in placing a carbon black plant on stream during startup is water condensation and corrosion that occurs in the collection equipment.

In a conventional startup procedure utilizing the effluent gases from the carbon black reactor and, particularly, if the reactor effluent has been quenched with water spray, the problem of water condensation and corrosion of the equipment is a problem which must be obviated. Assuming that the collection system has previously been idle, as is usually the case, the internals of the collection system are cooler than the quenched gases. Essentially, therefore, the relatively cooler collection system internals condense water from the quenched gases. The resultant condensate corrodes the metal portions of collection equipment and can be especially harmful to the filter bags, usually glass fiber bags, employed in bag filter units. Eventually after a waiting period of at least several hours during which condensation continues, the internals of the collection system will gradually heat up and eventually become hotter than the dew point of the combustion gases. Then, no more condensate forms and the previously deposited condensate gradually is evaporated. The present invention is directed to solving this problem of plant startup and water condensation during startup by utilizing a low oxygen content steam stream to warm the bag filters to normal operating conditions and then continuing normal operations utilizing carbon black effluent gases to pass through the collection system.

Accordingly, an object of this invention is to provide a process for starting up a carbon black producing system without condensation occurring on the internal surfaces of the collection system thereby greatly reducing corrosion of the internal metal parts.

Another object of this invention is to provide a process which reduces the time necessary for starting up a carbon black producing system.

Other objects, aspects, as well as the several advantages of the invention will be apparent to those skilled in the art upon reading the specification, the drawing, and the appended claims.

In accordance with the invention, the internals of a collection system of a carbon black plant are readied for use by heating them with a low oxygen content steam stream which can be produced in the carbon black plant.

In accordance with one embodiment, the process of the invention comprises producing hot combustion gases low in free oxygen and utilizing this stream for heat exchange to produce a high pressure steam stream which is then passed through the collection system and, especially, the bag filters to heat the collection system to normal operating temperatures with minimum water condensation and corrosion.

Further, in accordance with the invention, hot combustion gases low in free oxygen are produced in a carbon black reactor and passed through a cooling system wherein a high pressure steam stream is produced, which steam is flashed to a lower pressure to produce super heated steam, and a portion of this super heated steam is combined with the cooled combustion gases and used for heating the collection system, containing the bag filters, to the operating temperatures. After the collection system is heated to the normal operating temperatures, the flow of combined gases through the collection system is terminated. The produced high pressure steam is then charged to other plant facilities; the hot combustion gases are then produced at the desired air-to-fuel ratio and are charged to the carbon black reactor along with the hydrocarbonaceous feedstock to produce the desired type of carbon black, or only preheated air can be used, as in the so-called soft black operation, and the carbon black reactor effluent is processed in the normal manner for passage through the heat exchange equipment and collection system.

The drawing is a schematic diagram of a carbon black producing system provided with the improvement of this invention.

Referring now to the drawing, fuel gas in line 11 and air in line 12 are introduced into carbon black reactor 10. The reactor 10 is fired with air and hydrocarbonaceous fuel introduced by lines 12 and 11, respectively, using about stoichiometric conditions to produce combustion gases low in free oxygen (but containing water vapor produced by combustion) which are removed from reactor 10 by way of line 13. Water quench is introduced into a downstream portion of the reactor 10 by way of line 14.

The hot reactor combustion gas is low in oxygen, quenched by water quench line 14 to about 2,000° F. maximum, and then is passed by way of line 13 to the tube side of a shell-tube waste heat boiler 15 to which shell-side is charged high pressure preheated water in line 16 to produce steam in line 17 which is passed to drum 18. Blowdown is removed from tank 18 by way of line 19 for discard. Boiler feed water is removed from drum 18 and charged by line 16 to heat exchanger 15 and saturated, high pressure steam is removed from tank 18 by way of line 20.

The reactor effluent exits waste heat boiler 15 by way of line 21 at about 500° F. and the heat in these gases is used to preheat the air charged to the reactor in heat exchanger 22 and then to feedstock preheater 23 to preheat the feedstock in line 24 which will later be charged the reactor 10 when the reactor 10 and the bag filter unit 37 are "on temperature."

Feedstock 44 from heater 23 during startup is not charged to reactor 10, but is passed by way of conduits 45 and 50 to feedstock surge 51, conduit 52, pump 53 and back to surge 51, or can be recycled in part via 54 and conduit 24 to feed preheater 23. Upon startup, feed can be passed via surge 51 and conduits 52 and 46 to reactor 10, or feedstock can by-pass the surge 51.

Air in line 25 is passed to blower 26 and thence line 27, at least in part, can either bypass indirect heat exchanger 22 by way of line 28 provided valve 29 is at least partially open or if valve 29 is at least partially closed is passed at least in part through coils 30 to be heated in exchanger 22 then is passed by way of line 12 to reactor 10.

The effluent gases are removed from the feedstock preheater 23 by way of line 31 at about 300° F. and are then blended with at least a portion of the flashed (now superheated) high pressure steam 41 produced in the waste heat boiler 15 after the gases pass through the feed water (economizer) heat exchange zone 32 which is used to preheat boiler feed water introduced thereto from line 33, and then passed through exchanger 32 and line 34 for introduction into drum 18. The further cooled gases removed from heat exchanger 32 in line 35 after combining with produced superheated steam 41 is passed by way of line 36 into bag filter unit 37.

Steam removed in line 20 from drum 18 in at least, in part, passed by way of line 38 through valve 39 and thence through expansion valve 40 wherein the steam is flashed from a typical about 600 psig and 489° F. to about a typical 0.3 psig resulting in superheated steam in line 41 to about 270° F. superheat. The use of superheated steam for heating the bag filters decreases the chances of water condensation in the bag filter unit.

In accordance with the invention, the blend of combustion gases in line 35 and superheated steam in line 41 are combined in line 36 and passed to bag filter unit 37 for bringing the bag filter unit up to normal operating temperature conditions. Off-gas is removed overhead from bag filters 37 by way of line 42. Carbon black is removed from bag filter 37 by way of line 43 when the reactor is producing carbon black.

After the bag filter unit 37 and reactor 10 are up to their preselected normal operating temperatures, the fuel in line 11 through the reactor can be cut out (as in soft black manufacture) and make oil or hydrocarbon feedstock is charged by way of line 24, through preheater 23, lines 44, 45, 46, and introduced into reactor 10 and, at the same time, superheated steam to the bag filter unit is stopped by closing valve 39. Thus, upon returning to carbon black producing conditions, the carbon black effluent in line 13 after being quenched in reactor 10 to about 2000° F. is passed through the waste boiler 15, air preheater 22, and feedstock preheater 23, economizer 32, and then to the bag filter 37 absent the steam addition to the bag filter.

An example of a method of operating the above-described system will now be set forth.

The specific example calculated follows and details the best method of operation of the invention's startup system showing flow rates, temperatures, pressures, etc.

Problem solved:

(a) Substantially no oxygen is in the bag filter after startup is finished, so no inert gas purging is necessary before the carbon black smoke is charged to the filters;

(b) Reactor is preheated and these gases from the reactor are used to produce the high pressure steam which is flashed, to superheat the steam, which is blended with the reactor effluent cooled gases as preheat gases for the bag filter. No water condensing occurs and substantially no free oxygen is in the bag filter. Water condensation [with $CO_2$, and even some $SO_2$ (sulfur in the fuel) can be present] can cause corrosion difficulties in the bag filter unit. No or substantially no free oxygen can be allowed to be in the filter unit when carbon black is filtered therein;

(c) No extraneous fuel, air, inert gases, etc., are needed in the invention's system.

Typical Operation Carbon Black
Reactor and Bag Filter Startup
(Calculated)

| | | |
|---|---|---|
| (12) Preheated Air: | | |
| SCF/hr, | | 484,000 |
| Contains Water (humidity) | | |
| SCF/hr (Typical) | | (5,670) |
| Temperature, °F. | | 250 |
| Pressure, psig | | 3 |
| (11) Fuel: | | |
| (Fuel Gas (~1000 Btu/SCF), SCF/hr, | | 24,200 |
| Products of Combustion in Reactor: | | |
| | SCF/hr | Lbs/hr |
| Oxygen, | 10,185 (2.1%) | 860 |
| Nitrogen, | 383,843 | 28,371 |
| Carbon Dioxide, | 26,937 | 3,128 |
| Water, | 55,079 | 2,616 |
| TOTAL | 476,044 | 34,975 |
| Temperature, °F. | | 2,657 |
| (14) Quench Water: | | |
| Lbs/hr, | | 3,629 |
| Temperature, °F. | | 90 |
| (13) Quenched Reactor Effluent: | | |
| | SCF/hr | Lbs/hr |
| Oxygen, | 10,185 | 860 |
| Nitrogen, | 383,843 | 28,371 |
| Carbon Dioxide, | 26,937 | 3,128 |
| Water, | 131,486 | 6,245 |
| TOTAL | 552,451 | 38,604 |
| Temperature, °F. | | 2,000 |
| (21) Cooled Effluent from Boiler: | | |
| | SCF/hr | Lbs/hr |
| Oxygen, | 10,185 | 860 |
| Nitrogen, | 383,843 | 28,371 |
| Carbon Dioxide, | 26,937 | 3,128 |
| Water, | 131,486 | 6,245 |
| TOTAL | 552,451 | 38,604 |
| Temperature, °F. | | 495 |
| (31) Combustion Gas from Air Preheater: | | |
| Temperature, °F., | | 410 |
| (35) Combustion Gas from Economizer: | | |
| Temperature, °F., | | 301 |
| Pressure, psig, | | 0.3 |
| (34) Feedwater to Boiler Zone: | | |
| Lbs/hr., | | 24,100 |
| Pressure, psig, | | 675 |
| Temperature, °F., | | 311 |
| (16) Water to Boiler: | | |
| Pressure, psig, | | about 600* |
| Temperature, °F., | | 464 |
| *(Slightly greater than 600) | | |
| (19) Blowdown: | | |
| Lbs/hr, | | 1,135 |
| Pressure, psig, | | 600 |
| Temperature, °F., | | 464 |
| (20) Total Saturated Steam Produced: | | |
| Lbs/hr, | | 22,965 |
| Pressure, psig, | | 600 |
| Temperature, °F., | | 489 |
| Steam (38) to Flash (40): | | |
| Lbs/hr, | | 20,000 |
| Pressure, psig, | | 600 |
| Temperature, °F., | | 489 |
| Steam (41) from Flash (40): | | |
| Lbs/hr, | | 20,000** |
| Pressure, psig, | | 0.3 |
| Temperature, °F., | | 489 |

Typical Operation Carbon Black Reactor and Bag Filter Startup (Calculated) -continued

| | | |
|---|---|---|
| Superheat degrees, °F., **(Superheated steam) | | 270 |

(40) Blend of Gases (35) and Flashed Steam (41):

| | SCF/hr | Lbs/hr |
|---|---|---|
| Oxygen, | 10,185 | 860 |
| Nitrogen, | 383,843 | 28,371 |
| Carbon Dioxide, | 26,943 | 3,128 |
| Water, | 552,603 | 26,245 |
| TOTAL | 973,574 | 58,604 |
| Temperature, °F., | | 390 |
| Pressure, psig, | | 0.3 |

The above-tabulated example illustrates a set of preferred operating conditions. Obviously, the temperatures, pressures, and flow rates can be varied over a wide range in order to effect dilution of combustion gases 35 with superheated steam 41 for use in filter bag vent 37 to prevent water vapor condensation therein during a cold startup. That is, effluent 13 can be quenched to a temperature in the range of about 2000° F. (preferred maximum) to about 1400° F. Stream 21 can exit at about 350° F. to about 600° F. Stream 38 can be flashed so as to contain about 50 to 290 degrees F. superheat. Stream 35 can be in a temperature range of about 250° F. to about 400° F.

I claim:

1. A process for startup of a carbon black plant comprising
producing hot combustion gases low in free oxygen;
bringing said hot combustion gases into heat exchange relationship with a fluid to produce a high pressure saturated stream which is flashed to produce superheated steam and a cooled combustion gas stream; and
using said superheated steam stream to warm bag filters in said carbon black plant.

2. A process according to claim 1 wherein at least a portion of said superheated steam is combined with said cooled combustion gas stream prior to using same to warm said bag filters.

3. A process according to claim 1 wherein flow of steam to the bag filters is terminated when the filters are at the desired operating temperature and the bags are then used to filter carbon black from a carbon black reactor effluent gaseous stream.

4. A process according to claim 1 wherein said hot combustion gases are produced from a hydrocarbonaceous fuel and an oxygen-containing gas in a carbon black producing reactor and upon reaching the desired reactor temperature the flow of said fuel is terminated and flow of carbon black producing hydrocarbon feed is initiated.

5. A process according to claim 1 comprising the steps of
(a) charging hydrocarbonaceous fuel and air in the absence of carbon black producing hydrocarbonaceous feed to a reactor and producing hot combustion gases low in free oxygen;
(b) quenching the produced hot combustion gases;
(c) passing the quenched gases produced in (b) to an indirect heat exchange zone which cools the gas and produces high pressure steam;
(d) flashing at least a portion of the high pressure steam produced in (c) to form superheated steam; and
(e) passing said superheated steam formed in (d) and cooled quenched combustion gases in (c) through the bag filters and gradually bring the bag filters to operating temperature with minimum water condensation and corrosion.

6. A process according to claim 5 wherein flow of said superheated steam is terminated in (e) when operating temperatures are reached in the filters and the flow of appropriate air, fuel, and hydrocarbonaceous feed rates to the reactor in (a) are commenced to produce carbon black.

7. A process according to claim 5 wherein the superheated steam formed in (d) is combined with the cooled quenched combustion gases in (c) and the combined gases are passed through the bag filters to bring the bag filter to operating temperature.

8. A process according to claim 5 wherein quenching in (b) reduces the temperature of the combustion gases to no higher temperature than about 2,000° F. and the combustion gases are further cooled in (c) to about 600° F. in a shell-tube water boiler.

* * * * *